(12) United States Patent
Ramaswamy et al.

(10) Patent No.: US 7,717,271 B2
(45) Date of Patent: May 18, 2010

(54) MEMBRANE STRUCTURE AND METHOD OF MAKING

(75) Inventors: Vidya Ramaswamy, Niskayuna, NY (US); James Anthony Ruud, Delmar, NY (US); Melissa Suzanne Sander, Schenectady, NY (US); Anthony Yu-Chung Ku, Rexford, NY (US); Mohan Manoharan, Niskayuna, NY (US); Milivoj Konstantin Brun, Ballston Lake, NY (US); Seth Thomas Taylor, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 438 days.

(21) Appl. No.: 11/296,746

(22) Filed: Dec. 7, 2005

(65) Prior Publication Data
US 2007/0125701 A1 Jun. 7, 2007

(51) Int. Cl.
*B01D 71/02* (2006.01)
*B01D 71/06* (2006.01)
*B01D 61/00* (2006.01)

(52) U.S. Cl. .............................. 210/500.1; 210/500.21; 210/500.22; 210/500.25; 210/500.27; 96/8; 96/12; 96/13

(58) Field of Classification Search ........................ None
See application file for complete search history.

(56) References Cited

U.S. PATENT DOCUMENTS

| | | | |
|---|---|---|---|
| 5,753,014 A * | 5/1998 | Van Rijn | 96/12 |
| 6,536,604 B1 | 3/2003 | Brinker et al. | |
| 2004/0014705 A1 | 1/2004 | Weiner et al. | |
| 2005/0061663 A1 | 3/2005 | Chen et al. | |

FOREIGN PATENT DOCUMENTS

| | | |
|---|---|---|
| EP | 0 494 187 | 7/1994 |
| WO | WO93/23154 A1 | 11/1993 |
| WO | WO9922843 A1 | 5/1999 |

OTHER PUBLICATIONS

PCT International Search Report dated May 15, 2007.

* cited by examiner

*Primary Examiner*—Krishnan S Menon
(74) *Attorney, Agent, or Firm*—Paul J. DiConza

(57) ABSTRACT

A membrane structure is provided. The membrane structure includes a first layer having a plurality of interconnected pores; and a second layer disposed on the first layer. The second layer has a plurality of unconnected pores. Each of the unconnected pores is in fluid communication with at least one of the interconnected pores of the first layer. A method of making a membrane structure is provided. The method includes the steps of providing a first layer having a plurality of interconnected pores; and disposing a second layer on the first layer. Disposing a second layer includes depositing a conducting layer on the first layer; and anodizing the conducting layer to convert the conducting layer into a porous layer.

30 Claims, 6 Drawing Sheets

MEMBRANE STRUCTURE AND METHOD OF MAKING

BACKGROUND

The invention relates generally to a membrane structure. More particularly, the invention relates to a membrane structure having substantially high flux and substantially high selectivity. The invention also relates to a method of making a membrane structure.

Porous membrane structures have been extensively used in filtration, separation, catalysis, detection, and sensor applications. Realizing membrane structures with fine pores and high flux is difficult, as the flux through the membrane decreases with decreasing pore size. Therefore, typically layers with fine pores are made very thin. Fabricating thin porous layers with uniform pores over large surface area and which are mechanically robust is a challenging task. Therefore, typically thin fine porous membranes are stacked on thicker substrates with coarser pores. In such membrane structures it is extremely difficult to get a defect free smooth interface between layers to ensure faultless connectivity through the membrane structure. In spite of much effort, the currently available membrane structures with fine pores exhibit undesirably low permeance. Therefore, it is desirable to improve the efficiency of fine porous membrane structures suitable for high temperature, high pressure, and/or corrosive atmospheres.

SUMMARY OF THE INVENTION

The present invention meets these and other needs by providing a membrane structure, which has high flux and high selectivity.

Accordingly, one aspect of the invention is to provide a membrane structure. The membrane structure includes a first layer having a plurality of interconnected pores; and a second layer disposed on the first layer. The second layer has a plurality of unconnected pores. Each of the unconnected pores is in fluid communication with at least one of the interconnected pores of the first layer.

A second aspect of the invention is to provide a method of making a membrane structure. The method includes the steps of providing a first layer having a plurality of interconnected pores; and disposing a second layer on the first layer. Disposing a second layer includes depositing a conducting layer on the first layer; and anodizing the conducting layer to convert the conducting layer into a porous layer.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
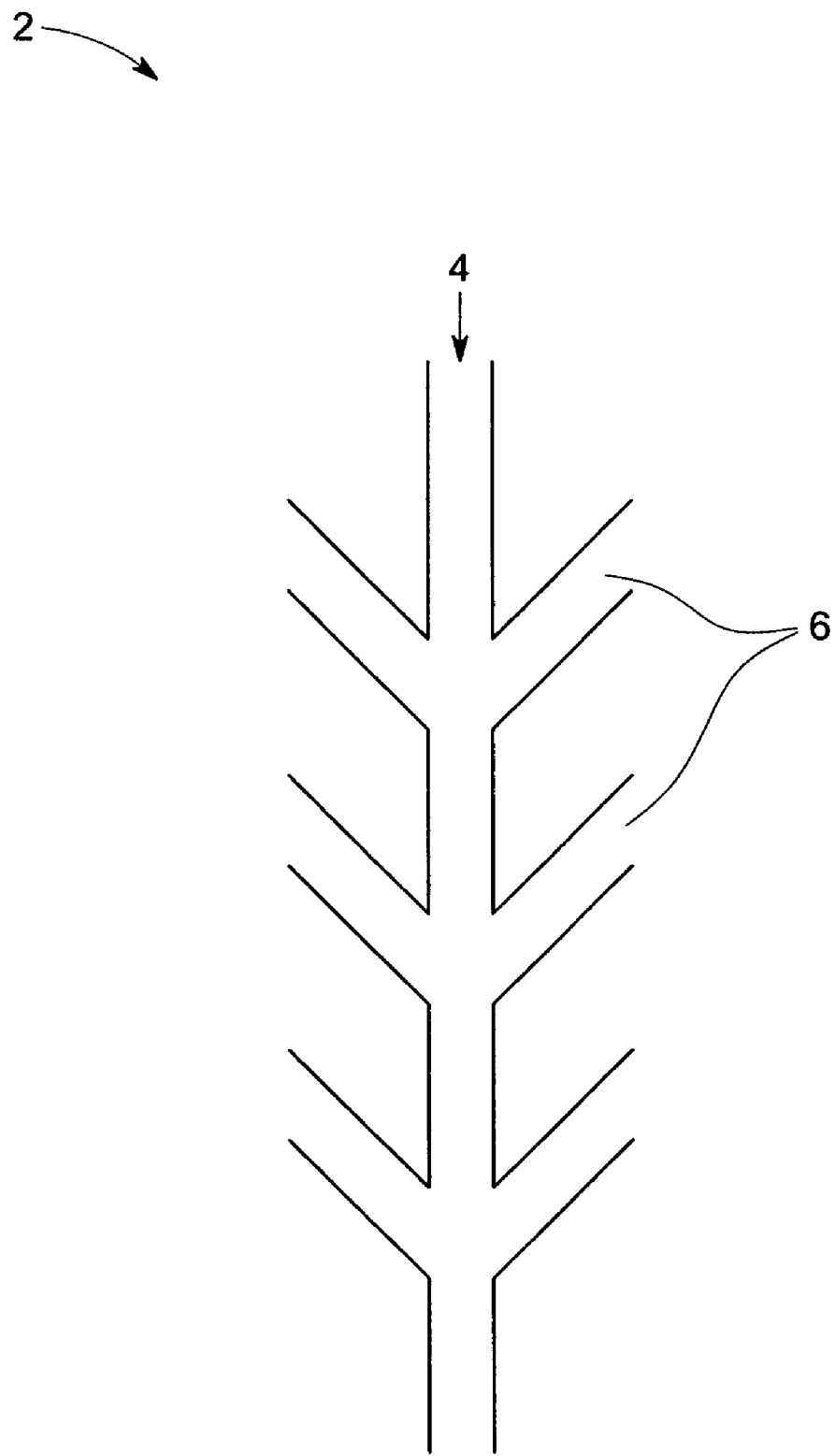
FIG. 1 is a schematic representation of a first-order branched pore structure, according to one embodiment of the present invention.

In the following description, like reference characters designate like or corresponding parts throughout the several views shown in the figures. It is also understood that terms such as "top," "bottom," "outward," "inward," "first," "second," and the like are words of convenience and are not to be construed as limiting terms. Furthermore, whenever a particular aspect of the invention is said to comprise or consist of at least one of a number of elements of a group and combinations thereof, it is understood that the aspect may comprise or consist of any of the elements of the group, either individually or in combination with any of the other elements of that group.

Referring to the drawings in general, it will be understood that the illustrations are for the purpose of describing one embodiment of the invention and are not intended to limit the invention thereto.

For the purposes of understanding the invention, the term "layer with substantially unconnected pores" is to be understood to be a porous layer in which pore connections are limited to, at most, a first-order branched structure 2, as illustrated in FIG. 1. A "first-order branched structure" as that term is used herein comprises one or more main stem pores 4 from which one or more branch pores 6 radiate, where a branch pore has no junctions with any other pore aside from its junction with its main stem pore. Note that the term "layer with substantially unconnected pores" includes, in addition to first-order branched structures, structures with completely isolated pores, as in a structure consisting of parallel, unconnected channels. Of course, one skilled in the art will recognize that an occasional defect is to be expected in fabricating such structures, and so a structure containing occasional defects (such as, for example, a small number of branch pores which join to other branch pores in violation of the above definition, or a small amount of connectivity between otherwise parallel, unconnected pore channels) will still be considered a structure with substantially unconnected pores if the number of defects is not sufficient to substantially alter the performance of the structure relative to what would be expected for a defect-free structure.

Figure 2:
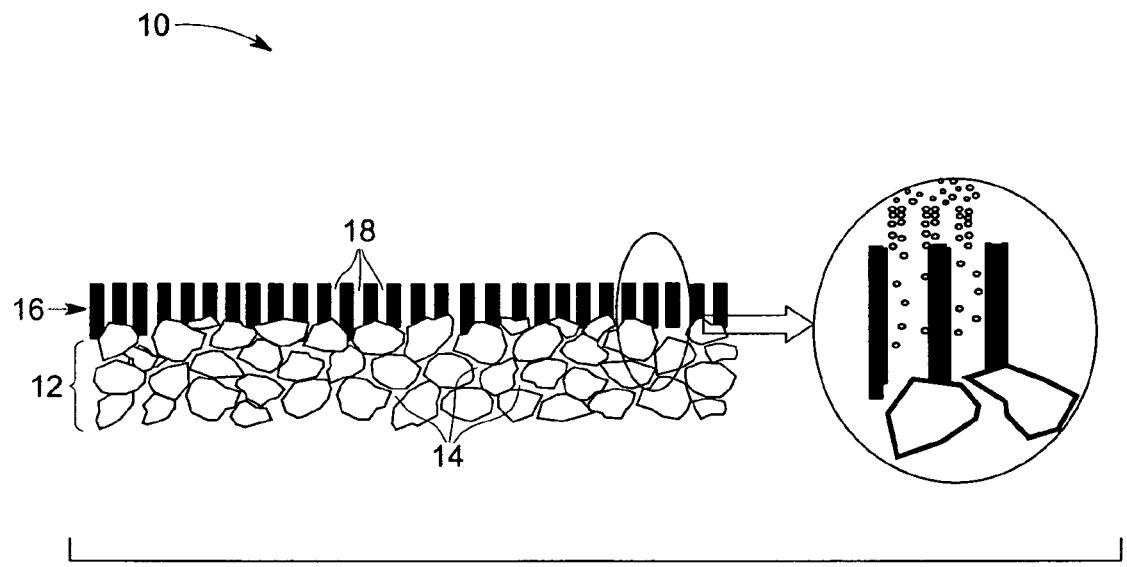
FIG. 2 is a schematic representation of a membrane structure, according to one embodiment of the present invention.

Schematic representation of a membrane structure according to one embodiment of the present invention is shown in FIG. 2. The membrane structure 10 of FIG. 2 includes a first layer 12 having a plurality of interconnected pores 14 and a second layer 16 having a plurality of unconnected pores 18 disposed on the first layer 12. Typically, each of the unconnected pores of the second layer 14 is in fluid communication with at least one of the interconnected pores of the first layer 12. The distinct connection between the layers establishes a registry between layers of the membrane structure and ensures high flux. In some conventional membrane structures, the porous layers are sandwiched together to form a membrane structure. In such structures, the establishment of fluid communication among pores of different layers is accomplished by probability—the chances that pores will align in the structure as one layer is coated onto or otherwise applied to the other layer. This dependence on probability to establish pore alignment results in a large number of misaligned pores that end up isolated from, or substantially occluded from, the rest of the structure. Any such defect or other irregularity at the interface may reduce the flux through the membrane structure. Therefore, achieving a faultless connectivity between the layers is critical to a membrane's performance for separator or filter applications. The membrane structures of the present invention have been designed to substantially mitigate such problems.

Typically the first layer includes a layer with a plurality of interconnected pores. The first layer may be a porous ceramic or a porous polymer layer. In one embodiment, the first layer has a porosity volume fraction of at least about 1%. In another embodiment, the first layer has a porosity volume fraction in the range from about 20% to about 70%. In yet another embodiment, the membrane structure has a porosity volume fraction in the range from about 30% to about 50%.

The total thickness of the membrane structure is chosen in such a way that the structure is thick enough for mechanical robustness, but not so thick as to impair permeability. The thickness of the individual layers is optimized depending on the end-use application. In one embodiment, the second layer has a thickness less than about 10 micrometers. In another embodiment, the second layer has a thickness in the range from about 10 nanometers to about 500 nanometers. In another embodiment, the inner layer has a thickness in the range from about 10 nanometers to about 100 nanometers.

Precise control over pore size and pore size distribution are among the parameters that define the membrane performance. The pore size of the layers is chosen based on the end use application of the membrane structure. In some embodiments, the second layer has a median pore size of less than about 1 micrometer. In other embodiments, the median pore size of the second layer is in a range from about 1 nanometer to about 500 nanometers. In some other embodiments, the median pore size of the second layer is in the range from about 1 nanometer to about 40 nanometers. In these embodiments, the pore size of the first layer is chosen so that they do not hinder the permeance of the species through the membrane structure.

In an exemplary embodiment, the second layer includes a plurality of cylindrical pores of uniform size all aligned approximately perpendicular to the membrane surface. Straight pores with low tortuosity reduce fluid dispersion and facilitate high flux through the membrane structure.

The material of the first layer and the second layers are chosen based on the end use application. Typically the first layer includes either a polymer or a ceramic with a suitable porosity, pore dimensions, and thickness. In an exemplary embodiment, the first layer includes a ceramic. Non-limiting examples of ceramics are oxides, carbides, nitrides, borides, and silicides. Examples of suitable ceramics include, but are not limited to, aluminum oxide, silica, silicate, rare-earth oxide, titania, zirconia, lanthana, yttria stabilized zirconia, a perovskite, a spinel, vanadia, ceria, and combinations thereof. In some embodiments, the ceramic may include a suitable dopant. Ceramic materials have the advantages of thermal and chemical stability, good erosion resistance, and high-pressure stability. Thus the membrane structures of the invention may withstand prolonged exposure to pressure or temperature differences that may be present in, for example, a gas separation or sensor assembly.

In some embodiments, the first layer includes a polymer. Suitable polymers that may be used include, but are not limited to, polysulphones, polyamides, cross-linked polyimides, polyether ketones, polyetherimides, silicone rubber, nitrile rubber, neoprene rubber, silicone, polycarbonate, polyarylene, polyphenylene ether, polyolefin elastomer, polybutadiene, vinyl polymers, or other thermoplastic polymers, combinations thereof, and block copolymers of these. These polymers may be used to achieve specific functionalities. For example, silicone rubber is very effective in removing volatile organic components such as toluene, methanol, methylene chloride, and acetone from gas streams.

In certain embodiments, the first layer includes more than one sublayer. In such embodiments, the sublayer not in contact with the second layer may include a metal. A pure metal or a metal alloy may be used. The metal may be applied on the membrane layers as a dispersed particulate, or a continuous coating, or a metal layer may be inserted into the membrane structure. In some embodiments, the membrane pore walls may be coated with a metal. The metal may be disposed into the membrane structure by any known coating technique including exposing the structure to a suspension of metal particulates, by electroless deposition, or electroplating, or chemical vapor deposition or physical vapor deposition techniques. In some embodiments, the metal is a platinum group metal. In one embodiment palladium with copper, gold or silver is used. In another embodiment, an alloy of palladium with ruthenium, osmium, nickel, platinum, or a combination of these is used. In some embodiments, the transition metal elements such as iron, nickel, cobalt, or copper may be included in the membrane structure. Many transition metal complexes show selective interaction with molecular oxygen involving reversible chemisorption, and thus are suitable for oxygen separation. These complexes may include a transition metal ion and a polydentate ligand. Some examples of suitable complexes are Co or Ni or Cu embedded in polyphyrins or oximes, to which axial bases such as nitrogen or sulphur are attached.

Typically, the second layer includes an oxide product of an anodization process. Some examples of such oxides include, but are not limited to, alumina, titania, silica, tin oxide, zirconia, niobium oxide, tungsten oxide, molybdenum oxide, tantalum oxide, aluminosilicate or combinations of one or more of these. In some embodiments, the second layer may include oxides of alloys metals including aluminum, titanium, tin, zirconium, niobium, tungsten, molybdenum, or tantalum. In an exemplary embodiment, the second layer includes alumina. Such oxides have the advantages of thermal, chemical stability, good erosion resistance, and high-pressure stability.

Figure 3:
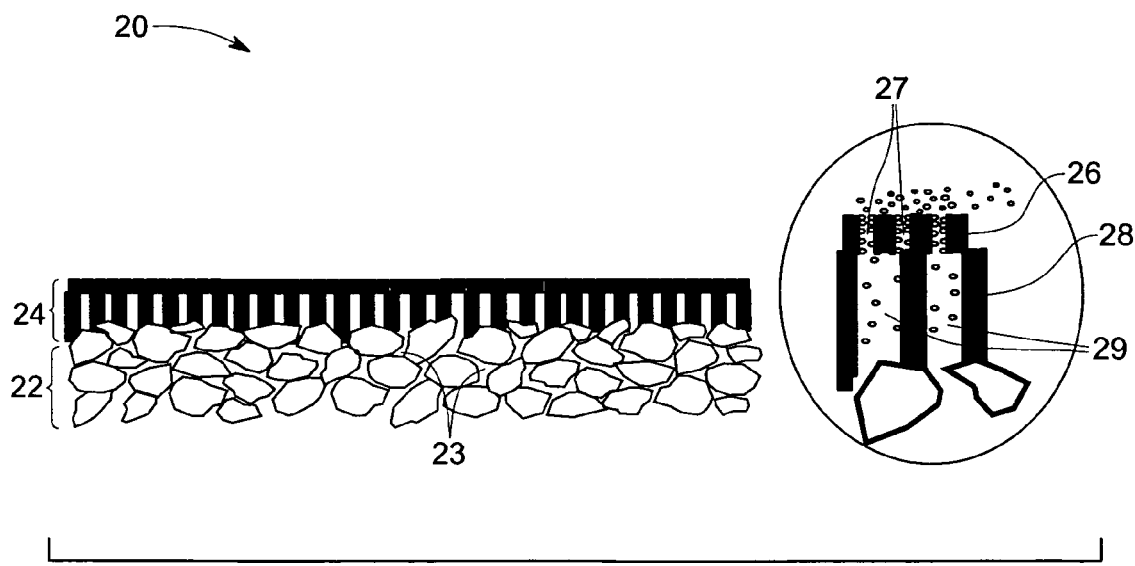
FIG. 3 is a schematic representation of a membrane structure, according to another embodiment of the present invention.

FIG. 3 shows a schematic representation of a membrane structure according to one embodiment of the present invention. The membrane structure 20 of FIG. 3 includes a first layer 22 having a plurality of interconnected pores 23 and a second layer 24 disposed on the first layer 12 and having two sublayers 26 and 28 each having a plurality of unconnected pores 27 and 29. Typically, each of the unconnected pores 27 of the sub layer 26 is in fluid communication with at least one of the interconnected pores of the first layer 12. In one embodiment, the sublayer exposed to the surface such as the sublayer 26 has finer pore sizes than a sublayer disposed beneath it such as a sublayer 28. By tuning the pore dimensions, the properties of the membrane structure may be controlled to provide performance suitable for any of a number of applications. For example, such membrane structures may be utilized as high flux membranes with Knudsen selectivity for gases. If the gases do not interact with the membrane surface, membranes prepared using the method described above could be used to separate gases using a Knudsen mechanism. The advantage of these membranes would be higher fluxes than for membranes with thicker active layers.

In another embodiment, the sublayer exposed to the surface such as the sublayer 26 has a coarser pore size than a sublayer disposed beneath it such as a sublayer 28. In all the above embodiments, the second layer may include more than two sublayers depending on the requirement of the end use application. The thickness and pore dimensions of each of the layers are chosen depending on the end use application.

In some embodiments, at least one of the layers includes a catalytic material. For example, by utilizing a catalytic coating or a catalytic layer within the membrane structure, it is possible to combine membrane separation with catalytic reaction to achieve high efficiency fluid mixture separation. The catalyzed reaction may be used, for instance, to reduce the concentration of one or more of the reaction products within the membrane structure, hence increasing the conversion efficiency. Catalytic materials may also be included in the membrane structure for microreactor or sensor applications. Some examples of catalysts include, but are not limited to, platinum, palladium, copper, copper oxide, ceria, zinc oxide, alumina, combinations thereof, or alloys thereof.

One skilled in the art would know how to choose a catalyst material based on the desired reaction and given working environment, then dispose the desired catalyst into the membrane structure. The catalysts may be disposed onto the structure by a number of coating techniques. They may be deposited by a physical vapor deposition or by chemical means. Examples of physical vapor deposition include, but are not limited to, evaporation, e-beam deposition, ion beam deposition, atomic layer deposition, or a suitable combination of these techniques. The catalyst may also be disposed into the membrane structure by means of chemical vapor deposition. The pores of the membrane structure may also be filled with a catalyst by simple capillary filling, or by spray coating. In such embodiments, the catalyst to be disposed may be taken as a sol, a solution or a gel. In some embodiments, the pore walls of one or more layers are coated with a catalyst. Alternatively, in some other embodiments, a catalyst layer may be disposed within the membrane structure.

The membrane layers may be functionalized with a suitable functional group to achieve specific functional properties. The functional group, in some embodiments, may be an acid, a basic, an amine, a hydroxyl, a carbonyl, a carboxyl, a mercapto group, a vinyl group, an alkyl, a fluoroalkyl, a benzyl, or an acryl group. These functional groups alter the surface properties of the membrane materials and impart specific properties to the membranes. For example, the functional groups may be used to change the wettability of the membrane pore surfaces to control the flow of fluid through the membrane. Functionalizing the pore surfaces is especially useful for biological or biomedical applications where the membranes desirably be hydrophilic, hydrophobic, lyophobic or lyophilic. The functional groups may be used to control the flow of specific chemical or biological species through the membrane. Specific functional groups may be used to control the attachment of cells or proteins to the membrane structure. For example, the functional groups may also be used to make the membrane structure biocompatible for biomedical applications. The functional groups may be disposed onto the membrane structure by any known coating technique. In some embodiments, the functional group may be attached to the selected regions of the layers by exposing the layers to solutions or vapor or ions including the desired species. Pre-treatment of the layers to enhance the adhesion of the functional groups and masking of regions to be protected during coating may be required.

In some embodiments, the membrane structure includes a composite material. The composite may include a ceramic-organic or a ceramic-ceramic composite. Any ceramic including those listed above may be used in the composite. The organic material may include a polymer, an oligomer, or a monomer.

The membrane structure of the invention may be useful in a number of applications. In some embodiments, the membrane structure is part of a separation assembly. The membrane structure in certain embodiments of the invention may be capable of molecular sieving suitable for purification of sub quality natural gas, air separation, $NO_x$ separation, oxygen separation, or hydrogen recovery from processing gases or feedstock. In one embodiment, the membrane structure of the invention may be used for separation of hydrogen from nitrogen, argon, carbon dioxide, or methane. In another embodiment, the membrane structure of the invention may be used for separation of volatile organic components from air streams. In some embodiments the membrane structure is a part of a high temperature gas separation unit. For such applications, a suitable metal or a polymer coating may be applied on one or more layers of the membrane structure. Alternatively, a metal or a polymer layer may be used in conjunction with the membrane structure.

Figure 4:
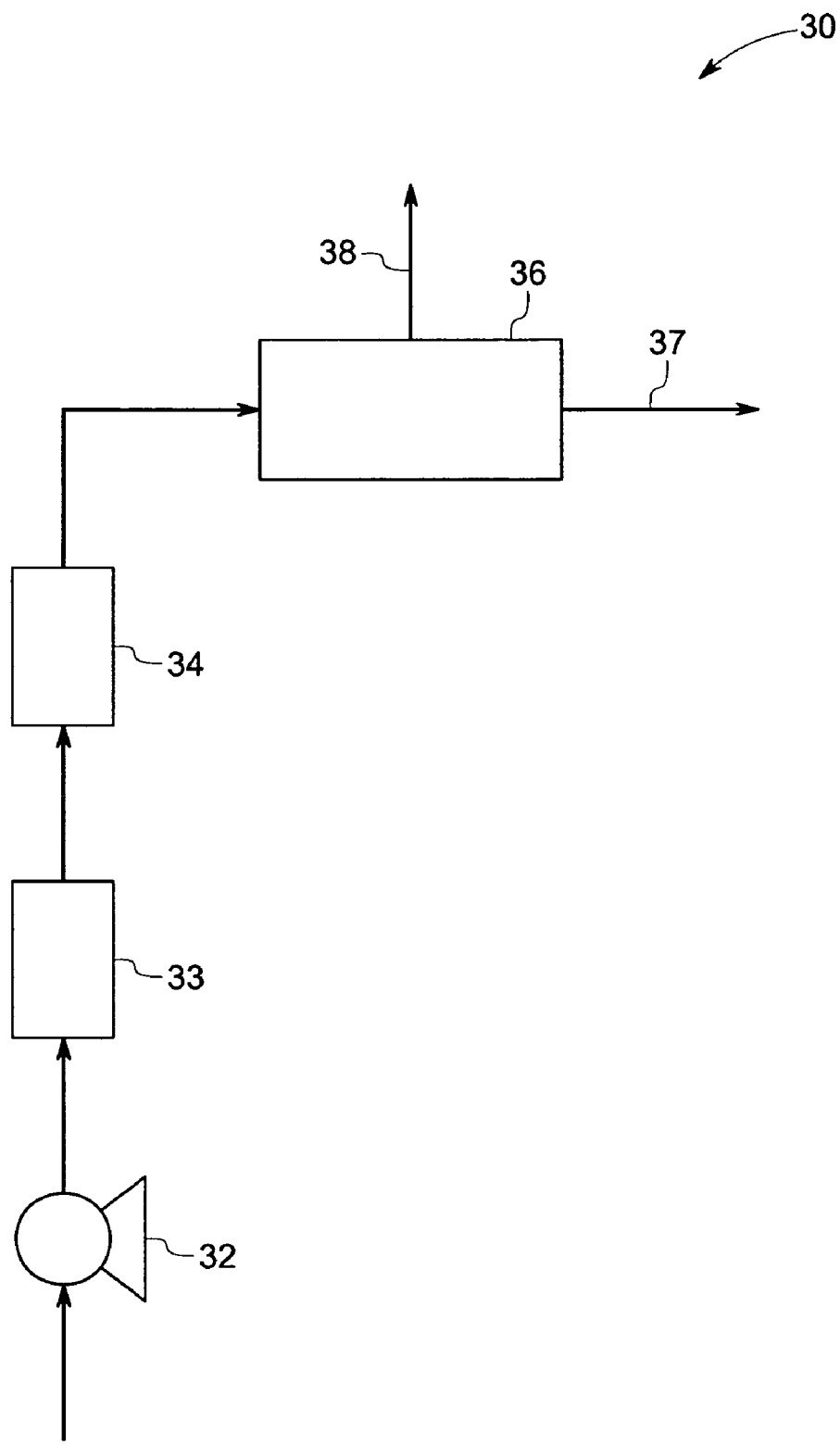
FIG. 4 is a schematic representation of a gas separation assembly incorporating membrane structure of the invention, according to one embodiment of the invention.

FIG. 4 shows a schematic representation of a simple gas separation unit 30 according to one embodiment of the invention. The unit 30 includes a compressor 32, a coalescing filter 33 and a pre-heater unit 34 connected to a membrane separation unit 36. Air under pressure flows first through the coalescing filter 33 and then through the pre-heater unit 34 before reaching the membrane separation unit 36. The coalescing filter may be used to remove oil or water droplets or particulate solids from the feed. The membrane separation unit includes one or more of membrane structure of the invention configured to remove a desired component from the air mixture. The desired component passes through outlet 37, leaving the waste permeate gases through outlet 38. The membrane separation unit may include additional heaters or additional filters.

The membrane structure may be used as a liquid-liquid separation assembly such as separation of water from fluid containing organic components. For such applications, the membrane structure may be combined with other porous or non-porous separation layers if needed. In one embodiment, a separation layer of non-porous cross-linked polyvinyl alcohol layer of suitable thickness is used in conjunction with the membrane structure. The pore structure and thickness of each of the layers may be adjusted depending on the requirement. In some embodiments, the membrane structure may be a membrane structure in a separation assembly that also includes a reactor component coated on the pore walls to prevent fouling.

In one embodiment, the membrane structure is part of a filtration assembly. By controlling the pore dimensions of the layers, the membrane structure of the invention may be used for microfiltration to filter out solid particles with dimensions less than about 10 micrometers, or for ultrafiltration to filter out particles with dimensions down to about 50 nanometers such as separation of macromolecules and bacteria. By choosing the pore dimensions of the layers to very small sizes, it is possible to use these membrane structures for hyperfiltration to filter out still smaller units such as sugars, monomers, aminoacids, or dissolved ions by reverse osmosis. In one embodiment, the membrane structure is a part of a bio-separation or reaction assembly. The pore size and thickness of the membrane layers are chosen depending on the sizes of the species to be separated. Accordingly in one embodiment, the membrane structure is a filter usable in food, pharmaceutical, and industrial applications. In another embodiment, the membrane structure is a part of a protein purification unit.

Figure 5:
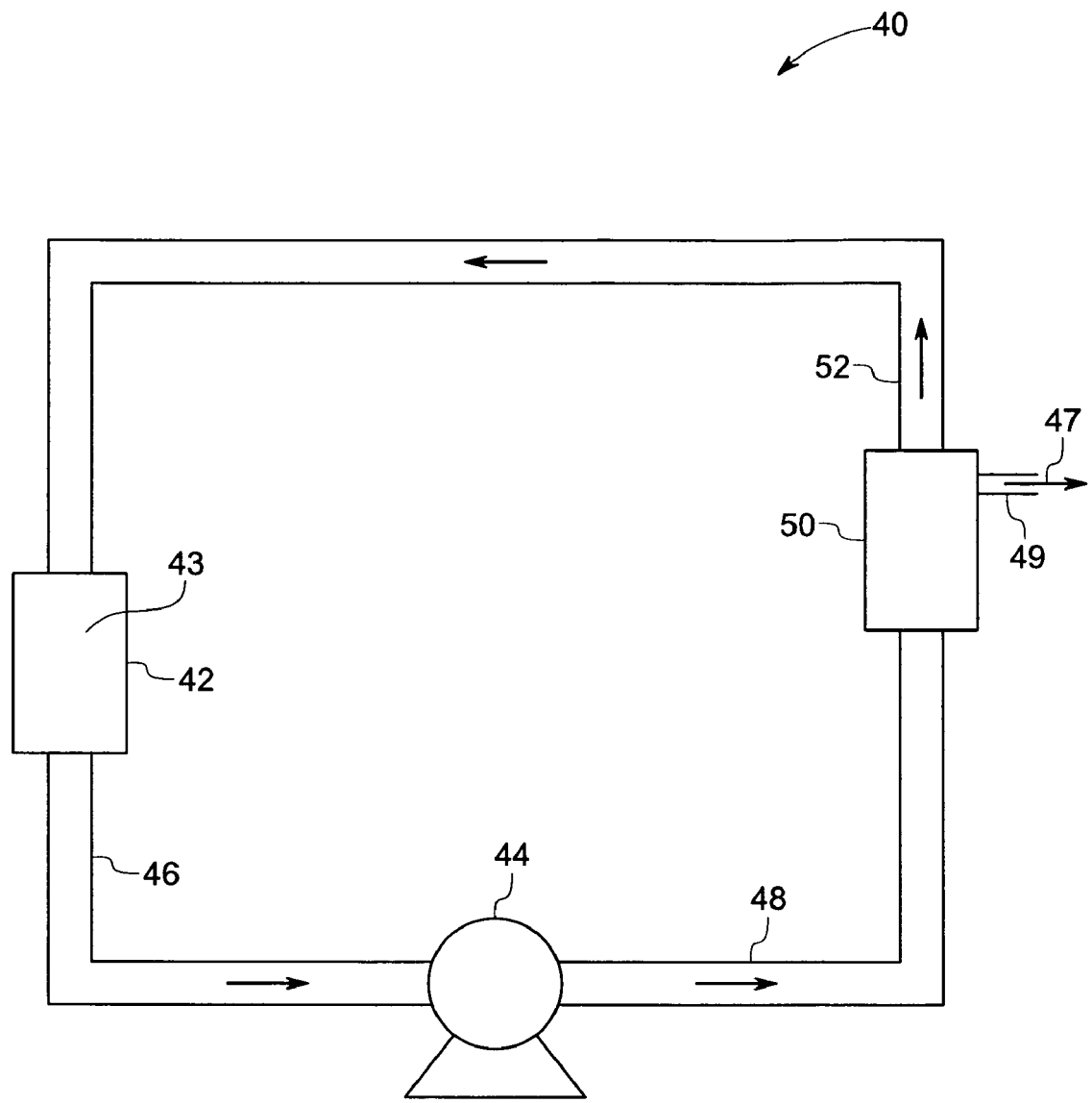
FIG. 5 is a schematic representation of a filter incorporating membrane structure of the invention, according to one embodiment of the invention.

FIG. 5 shows a schematic representation of a simple filter unit 40 according to one embodiment of the invention. The unit 40 includes a feed tank 42 used for storing the liquid medium containing the material to be separated. The circulation of the feed 43 is controlled by the pump 44 that draws the feed 43 through lines 46 and 48 into a membrane filter assembly 50. The membrane filter assembly 50 includes one or more of the membrane structure of the invention configured to filter out a specific component from the feed. The desired component 'filtrate' 47 passes through outlet 49, while the retentate 52 may be removed or returned to the feed tank 42.

In one embodiment, the membrane structure is part of a reactor assembly, performing similar functions to conventional membranes present in reactors such as filtration and separation. In another embodiment, the membrane structure is capable of reactive separation wherein the membrane structure is a reactor that also separates one of the products. In an exemplary embodiment, the membrane structure is a part of a chemical microreactor assembly that generates hydrogen fuel from liquid sources such as ammonia. In such embodiments, suitable hydrogen permselective catalysts are used in the membrane structure.

In one embodiment, the membrane structure is part of a sensor assembly. In such embodiments, the membrane layers may be functionalized with functional groups as discussed above, to incorporate reversible changes within the membrane structure. Examples of reversible changes include, but not limited to, chemical reactions such as ionization, oxidation, reduction, hydrogen bonding, metal complexation, isomerization, and covalent bonding. These changes may be utilized to detect a chemical or a biological species, or to detect change in temperature, pH, ionic strength, electrical potential, light intensity or light wavelength. The use of membrane structures for sensor applications is expected to enhance the performance of detection because of their high surface to volume ratio.

Figure 6:
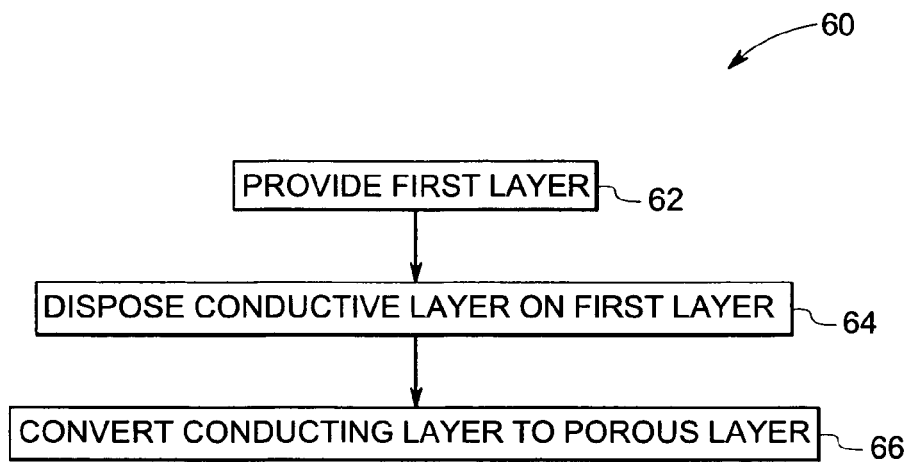
FIG. 6 is a flow chart of a method of making membrane structure, according to one embodiment of invention.

Another aspect of the invention is to provide a method for preparing a membrane structure. A flow diagram of the method of making a membrane structure is shown in FIG. 6. The method 60 begins with step 62, wherein a porous first layer having a plurality of interconnected pores is provided. In step 64, a electrically conducting coating is deposited on the porous substrate. In step 66, the electrically conducting layer is coated with a mask on the surface and anodized through the porous substrate in an acidic medium to convert the conducting layer into a porous layer.

Figure 7:
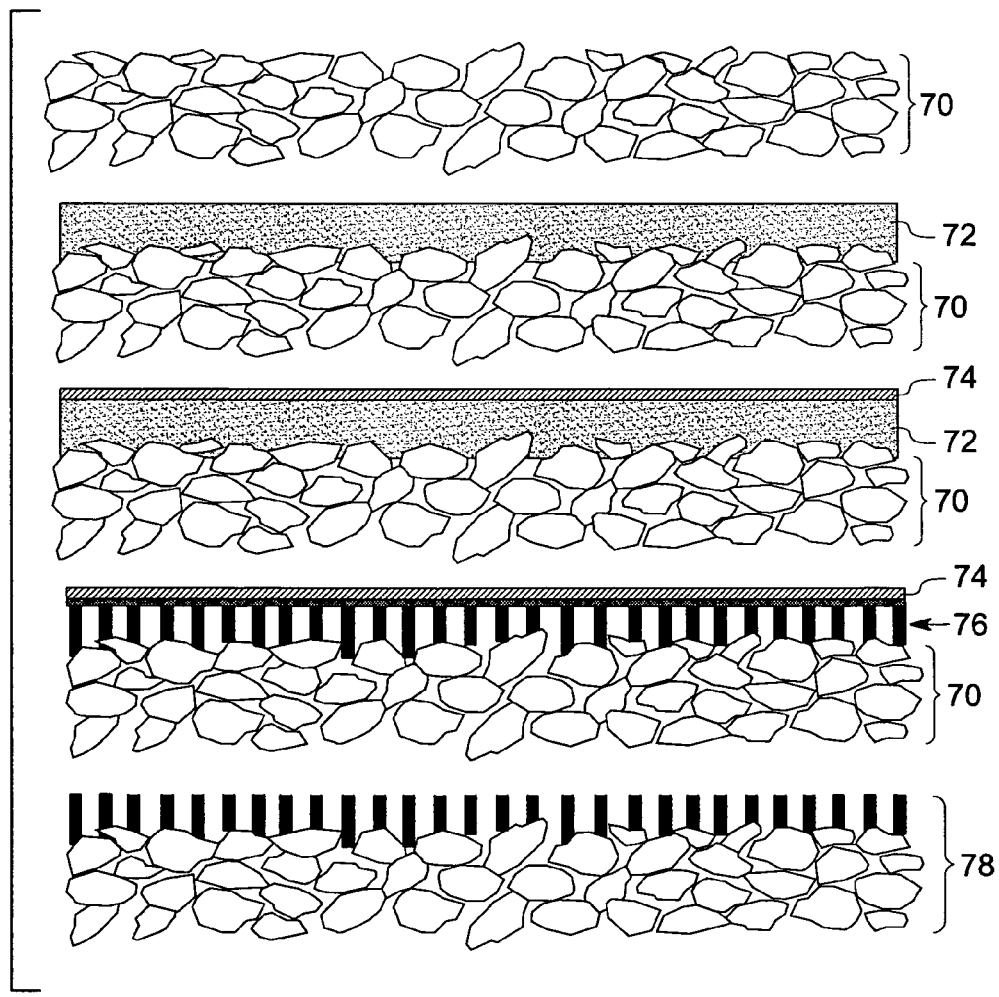
FIG. 7 is a schematic representation of a method of making membrane structure, according to one embodiment of invention.

In FIG. 7, the schematic of the process steps are shown. To begin with, a porous first layer 70 is provided. Any fabrication technique suitable for fabricating porous layers may be used to fabricate the first layer. In embodiments where the first layer includes a ceramic, the layer may be made by a casting process. To start with, a slurry including the ceramic powder of the desired material is prepared. The slurry may include a binder and a curing agent. The amount of powder in the slurry is generally adjusted to have the best rheological character. Further additive agents may be mixed into the slurry, such as a dispersing agent for improving the dispersibility and to prevent rapid settling, and a platicizer for improving the binding force between the binder and the ceramic particles and to lower the risk of cracks. Typically a layer is formed on a substrate by applying the slurry on the substrate. Any technique known in the art for preparing layers may be used for forming the first layer. Non-limiting examples of useful formation techniques include, but are not limited to, spraying, screen printing, ink-jet printing, casting, wire-bar coating, extrusion coating, gravure coating, roll coating, and combinations thereof. In some exemplary embodiments, a casting technique, such as tape casting, is used. Tape casting proves useful for making large area thin ceramic sheets with controlled thickness and porosity. The process may include an intermediate a curing process to remove organic binders and solvents and a sintering step to densify the layer. Exemplary sintering techniques may involve heating at a specified temperature for a specified duration, or microwave irradiation, or electron beam irradiation, or UV light exposure, or a combination of those. The porosity, pore size, and pore size distribution is controlled by the particle sizes of starting material. It is desirable to start with particles of uniform particle sizes in order to achieve uniform pore structure with minimal pore size distribution. Defect free layers with desired porosity may be obtained by a precise control of sintering conditions.

In embodiments, where the first layer includes a polymer, any technique known in the art to make porous polymer layers may be used to fabricate the first layer. For example, a thermoplastic, or a thermoplastic elastomer, or a thermoset polymer may be mixed with a porogen and cast into a thin layer of desired thickness. The layer may be heat treated or exposed to light or any other radiation to convert the layer into a porous layer. When the polymer chosen is a blend of two polymers, it is possible to control the casting conditions, such as the solvents used, to get a porous layer by phase separation.

In step 64, a coating of electrically conducting material 72 is disposed on the first layer 70. The thickness of the second layer is determined by the thickness of the deposited conducting coating. Any coating technique known in the art is used for depositing the conducting layer. Some examples of suitable coating techniques include, but are not limited to, exposing the structure to a suspension of particulates, by electroless deposition or electroplating, or chemical vapor deposition or physical vapor deposition techniques, including atomic layer deposition.

In step 66, the electrical conducting coating is protected with a mask 74 and the conducting layer is anodized in an acid electrolyte through the porous first layer. It is known that certain materials such as aluminium, silicon, tin, titanium, zirconium, niobium, tungsten, molybdenum, tantalum, and their alloys form a porous oxide layer when anodized in an acid medium. The simultaneous formation of oxide layer at the conducting layer surface and dissolution of the formed oxide into the acid give rise to a peculiar porous structure including a plurality of cylindrical pores of uniform size. Typically, a strong acid such as a phosphoric, a sulfuric, or an oxalic acid is used as an electrolyte. The pore size and the spacing between the pores may be controlled by adjusting the current/voltage during anodic oxidation. The thickness of the oxide film formed 76 is controlled by the anodization duration. Anodization may be stopped when the desired thickness of the porous oxide film is grown. After protecting the oxide porous layer, the passivation layer between the porous oxide layer and the substrate may be removed by etching to obtain a membrane structure 78. The embodiments of the method of the invention ensure that each pore formed by anodization has connectivity with the porous support layer.

The controlled anodization of the conducting layer through the porous substrate ensures complete connectivity between the pores of the substrate and the porous oxide layer. Each of the parallel pores of the oxide film is in fluid communication with at least one of the interconnected pores of the porous substrate. Membrane structures of the prior art that incorporate anodized oxide layers are generally fabricated by peeling the metal oxide grown on the substrate from the substrate and bonding the oxide layers with a partly sintered particle layer. The integrated membrane structure of the invention is superior to such "sandwiched" structures due to their good mechanical adhesion between the layers and the distinct fluid communication between the pores of the two layers.

Figure 8:
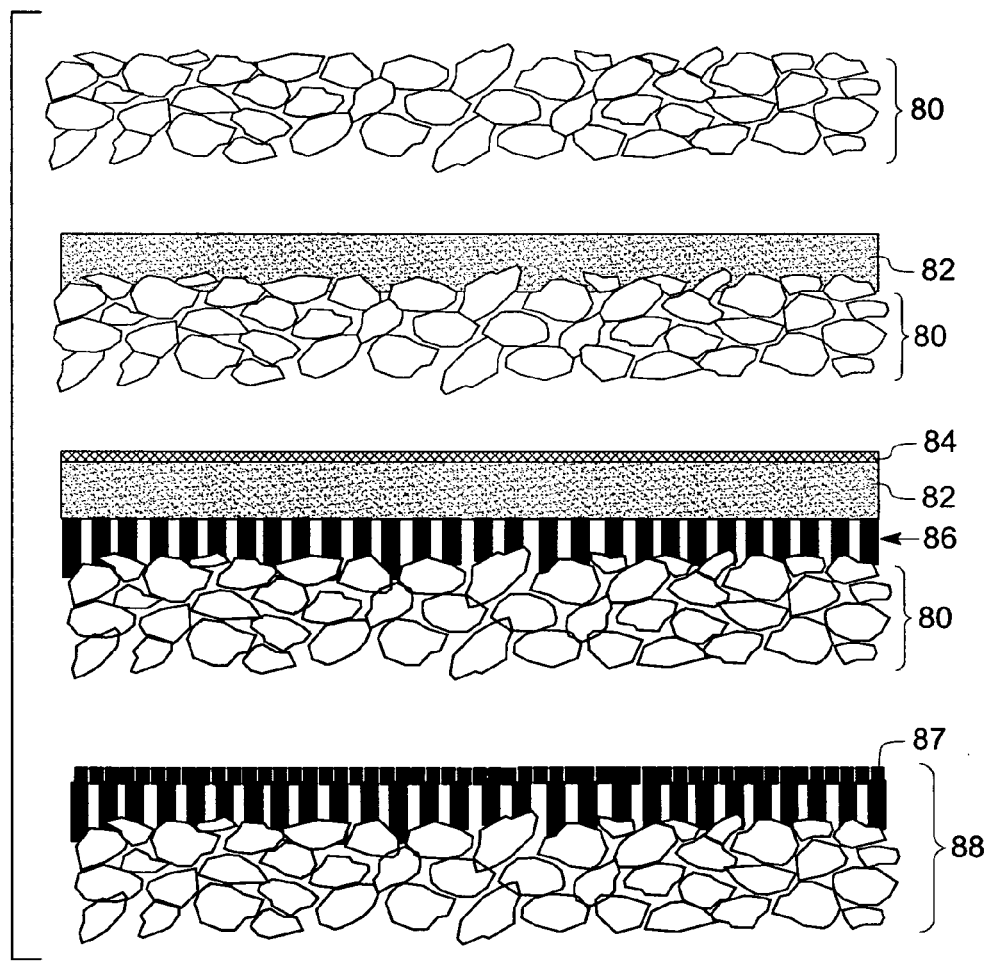
FIG. 8 is a schematic representation of a method of making membrane structure, according to another embodiment of invention.

It is possible to fabricate membrane structures with different configurations by tuning the anodization conditions. For example, the method of making a membrane structure according to another embodiment of the invention is shown as a schematic diagram in FIG. 8. In this case, first a porous first layer 80 having a plurality of interconnected pores is provided. Next, a conducting layer 82 is deposited on the porous substrate. The conducting layer 82 is coated with a protective layer 84 on the surface and anodized at a particular voltage through the porous substrate in an acidic medium to convert the conducting layer into a porous sublayer 86 with a particular pore dimension. Once the desired thickness of the sublayer 86 is formed, the structure is anodized at a reduced anodization voltage to obtain a sublayer 87 with finer pores. It is possible to introduce any number of sublayers with sequentially reducing pore dimensions to fabricate asymmetric membranes by tuning the anodization current or voltage. Finally the passivation layer between the substrate and the metal oxide layer may be removed to obtain an asymmetric membrane structure 88. Alternatively, layers with non-monotonically graded pore sizes may be fabricated by anodizing from the top surface as well as through the porous first layer. In such embodiments, the layers with the smallest pores may be obtained at the center of the anodized layer.

Typically, mesoporous asymmetric inorganic membranes are prepared by forming a mesoporous film on a porous support or by incorporating the mesoporous material within the macropores of the support. In such embodiments, the sol or the gel may clog some of the pores and it is difficult to control the size and size distribution by any of these techniques. Alternatively, asymmetric inorganic membranes are prepared by sandwiching layers with different pore sizes. In such membrane structures, as discussed above, it is difficult to achieve well connectivity and good bonding between layers. The method of this invention provides a simple and a versatile method to prepare membrane structures with precise pore dimensions and high flux and selectivity.

The following example serves to illustrate the features and advantages offered by the present invention, and not intended to limit the invention thereto.

EXAMPLE

The following examples describe the preparation method for making anodized alumina membrane structures.

Example 1

Method for Fabricating a Membrane Structure of Anodized Alumina on Porous Support Layer A continuous aluminum coating of 1 micrometer to 2 micrometers thick is deposited on a porous alumina support. The aluminum surface is masked with nail polish to protect it. The aluminum is then anodized through the porous support in oxalic acid at voltages greater than 20 V ensuring that the pores in the anodized alumina layer that forms are connected to the substrate porosity. The anodized alumina pore diameter is determined by the anodization voltage. The anodized alumina layer thickness is determined by anodization time. Once the anodized alumina layer is of the desired thickness, anodization is stopped and the balance aluminum is etched from the surface using a copper chloride solution. Finally a barrier oxide layer is etched away using 5 wt % phosphoric acid to reveal the top surface of the porous alumina layer.

Example 2

Method for Fabricating a Membrane Structure of Asymmetric Anodized Alumina on Porous Support Layer A continuous aluminum coating of 1 micrometer to 2 micrometers is deposited on a porous alumina support. The aluminum surface is masked with nail polish to protect it. The aluminum is then anodized through the porous support in oxalic acid at voltages greater than 20 V, as described above. Once the anodized alumina layer is of the desired thickness, anodization voltage is decreased to get a porous sublayer with finer pores. Multiple alumina sublayers with decreasing pore size may be fabricated by sequential reduction in voltage. Any remaining aluminum is etched from the surface using a copper chloride solution. Finally a barrier oxide layer is etched away using 5 wt % phosphoric acid to reveal the top surface of the porous alumina layer.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A membrane structure comprising:
a first layer having a plurality of interconnected pores; and
a second layer disposed on the first layer, the second layer comprising an anodized oxide structure having a plurality of unconnected pores;
wherein the first layer includes more than one sublayer; wherein the sublayer not in contact with the second layer includes a metal; and
wherein each of the unconnected pores is in fluid communication with at least one of the interconnected pores of the first layer.

2. The membrane structure of claim 1, wherein the first layer comprises a material selected from the group consisting of a ceramic and a polymer.

3. The membrane structure of claim 1, wherein the first layer has a porosity greater than about 1%.

4. The membrane structure of claim 3, wherein the first layer has a porosity in a range from about 20% to about 70%.

5. The membrane structure of claim 4, wherein the first layer has a porosity in a range from about 30% to about 50%.

6. The membrane structure of claim 1, wherein the second layer comprises an oxide of a material selected from the group consisting of aluminum, titanium, silicon, zirconium, niobium, tungsten, molybdenum, tantalum, combinations thereof, and alloys thereof.

7. The membrane structure of claim 1, wherein the second layer comprises a material selected from the group consisting of alumina, zirconia, and titania.

8. The membrane structure of claim 6, wherein the second layer comprises alumina.

9. The membrane structure of claim 1, wherein the second layer has a thickness less than about 10 micrometers.

10. The membrane structure of claim 1, wherein the second layer has a thickness in the range from about 10 nanometers to about 500 nanometers.

11. The membrane structure of claim 10, wherein the second layer has a thickness in the range from about 10 nanometers to about 100 nanometers.

12. The membrane structure of claim 1, wherein the second layer has a median pore size of less than about 1 micrometer.

13. The membrane structure of claim 1, wherein the second layer has a median pore size in the range from about 1 nanometer to about 500 nanometers.

14. The membrane structure of claim 13, wherein the second layer has a median pore size in the range from about 1 nanometer to about 40 nanometers.

15. The membrane structure of claim 1, wherein the second layer comprises a fine pore sublayer disposed on a coarse pore sublayer, the coarse pore sublayer disposed on the first layer.

16. The membrane structure of claim 1, wherein at least one of the layers comprises a catalytic material.

17. The membrane structure of claim 1, wherein at least one of the layers comprises a functional group.

18. The structure of claim 17, wherein the functional group is at least one selected from the group consisting of an amine, a carboxyl, a mercapto, a carbonyl, a hydroxyl, a vinyl, an alkyl, a benzyl, a fluoroalkyl, and an acryl group.

19. The membrane structure of claim 1, wherein the metal comprises a transition metal.

20. The membrane structure of claim 1, wherein the metal comprises at least one selected from the group consisting of a platinum group metal, iron, nickel, cobalt, copper, combinations thereof, and alloys thereof.

21. The membrane structure of claim 1, wherein the membrane structure comprises an organic material.

22. The membrane structure of claim 21, wherein the organic material comprises a polymer.

23. The membrane structure of claim 22, wherein the polymer is one selected from the group consisting of polysulphones, polyamides, cross-linked polyimides, polyether ketones, polyetherimides, silicone rubber, nitrile rubber, neoprene rubber, silicone, polycarbonate, polyarylene, polyphenylene ether, polyolefin elastomer, polybutadiene, vinyl polymers, combinations thereof, and block copolymers thereof.

24. A separation assembly comprising the membrane structure of claim 1.

25. A gas separation assembly comprising the membrane structure of claim 1.

26. A high temperature gas separation assembly comprising the membrane structure of claim 1.

27. A filtration assembly comprising the membrane structure of claim 1.

28. A reactor assembly comprising the membrane structure of claim 1.

29. A sensor assembly comprising the membrane structure of claim 1.

30. A membrane structure comprising:
a first layer having a plurality of interconnected pores; and
a second layer disposed on the first layer, the second layer comprising an anodized alumina having a plurality of unconnected pores, wherein each of the unconnected pores is in fluid communication with at least one of the interconnected pores of the first layer;
wherein the first layer includes more than one sublayer; wherein the sublayer not in contact with the second layer includes a metal.

* * * * *